UNITED STATES PATENT OFFICE.

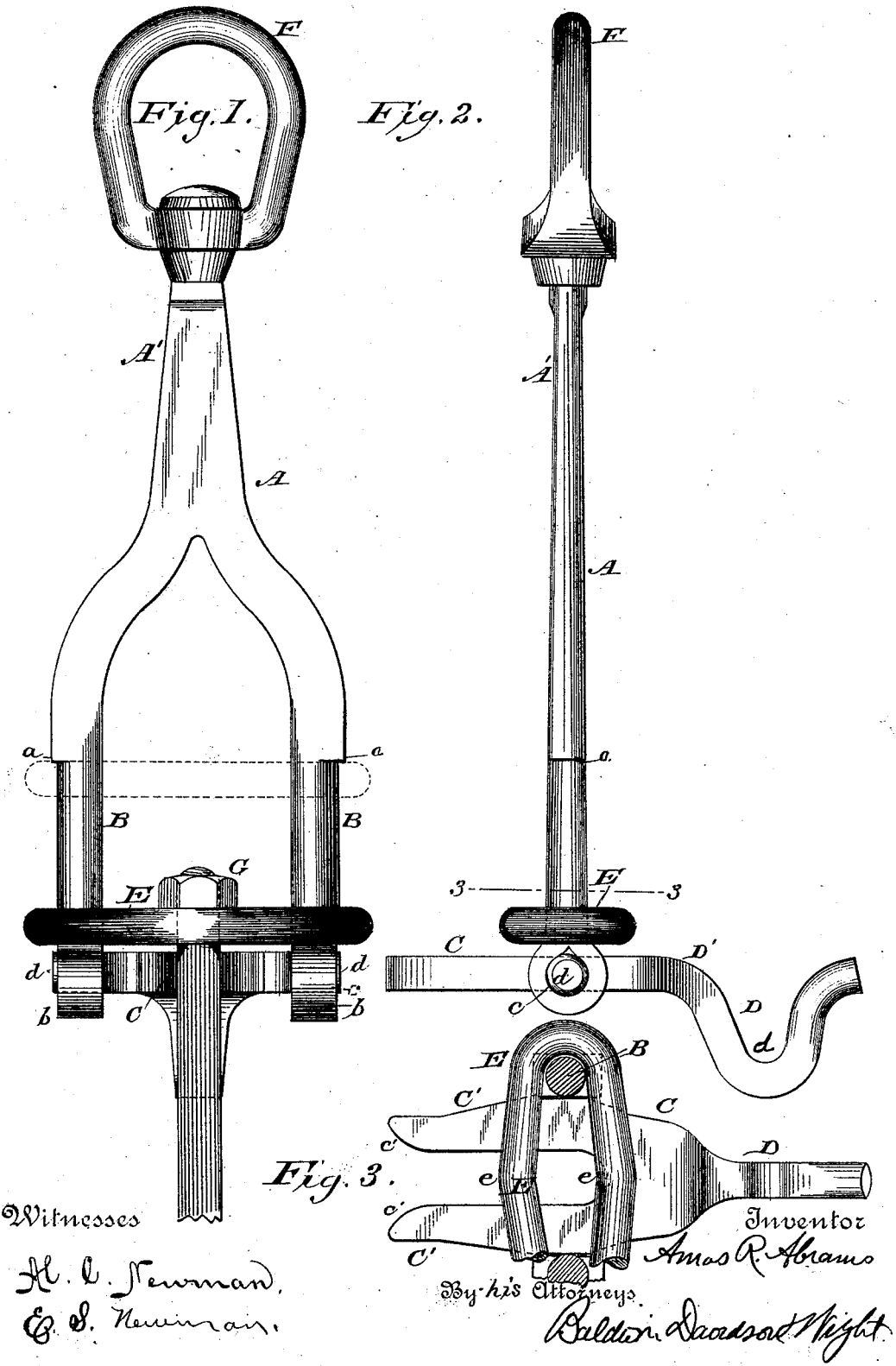

AMOS R. ABRAMS, OF CLARK'S MILLS, PENNSYLVANIA.

SUCKER-ROD ELEVATOR.

SPECIFICATION forming part of Letters Patent No. 416,246, dated December 3, 1889.

Application filed May 25, 1889. Serial No. 312,180. (No model.)

*To all whom it may concern:*

Be it known that I, AMOS R. ABRAMS, a citizen of the United States, residing at Clark's Mills, in the county of Mercer and State of Pennsylvania, have invented certain new and useful Improvements in Elevators for Sucker-Rods, of which the following is a specification.

The object of my invention is to provide a device for attaching sucker-rods to the sucker-rod elevator, which shall be simple in construction, strong and durable, and easily operated.

My invention consists in the devices hereinafter described and claimed, and illustrated in the accompanying drawings, in which—

Figure 1 is a front elevation of my invention; Fig. 2, a side elevation, and Fig. 3 a transverse cross-section on the line 3 3 of Fig. 2.

The body A of the device is bifurcated or forked at its lower end. The arms or tines B are straight and parallel at their lower ends and preferably round in cross-section, as shown, from the shoulders $a$ to the enlarged ends $b$. The ends $b$ are provided with apertures $c$ to receive the trunnions $d$ of the rod holder or wrench C. The rod holder or wrench consists of a plate slotted or bifurcated, as shown in Fig. 3, and having trunnions $d$ projecting from opposite sides and extending through the apertures $c$ in the arms B. The arms C' of the plate project laterally beyond the arms B when the plate is in a horizontal position, as shown in Fig. 2. The opposite end of the plate is provided with a hook or catch D, preferably formed integrally with the plate and joining it by a curved shank D'. The hook or catch D is so formed and joined to the main body of the plate C as to be held a suitable distance from the axial line of the trunnions, for a purpose hereinafter specified.

A link or endless band E embraces the arms B closely, but is free to move vertically between the enlarged lower ends $b$ and the shoulders $a$. Its upward movement is limited by the enlarged ends $b$ and its downward movement by the plate C when the plate is in a horizontal position, as shown in Fig. 2. The sides of the link are bent outwardly, as shown at $e$, thereby enlarging the opening in the link midway between its ends.

The shank A' of the body-piece is connected at its upper end to a swivel-lip F, which may be connected with the usual elevating apparatus.

To attach a sucker-rod to my improved connecting device, the plate C may be turned to assume a vertical position parallel with the arms B, and the link raised, as shown in dotted lines in Fig. 1, and the hook D made to engage with the link E when it is thus raised, so as to hold it in an elevated position. The hook engages with the link when the link lies in the recess $d$ of the hook. The nut G of the rod is made to rest on the upper face of the plate, and the shank of the rod extends through the slot in the plate. This is done by sliding the upper end of the rod laterally into the slot, the nut or head of the rod lying above the slot and extending across it. If, now, the plate is turned to a horizontal position and the link moved down or allowed to fall to the lower ends of the arm B, the plate will be securely held in a horizontal position and the nut contained between the sides of the link and the rod held securely in the slot. By elevating the link and turning the plate C into an upright position and causing the hook D to engage with the link, as above stated, the upward movement of the link is limited by the shoulders $a$.

As shown in Fig. 3, the arms C' of the plate C are slightly inclined or tapered at $c'$ to guide the rod into the slot.

I claim as my invention—

1. The combination, substantially as hereinbefore set forth, of the shank, the parallel lower arms enlarged at their lower ends and provided with shoulders $a$ at their upper ends, a slotted plate or wrench having trunnions extending into the enlarged lower ends of the arms, and the link which rests on the plate when it is in a horizontal position, said link being free to be moved vertically from the enlarged lower ends of the arms to the shoulders $a$, for the purpose specified.

2. The combination, substantially as hereinbefore set forth, of the shank, the parallel arms thereof provided with shoulders $a$ and enlarged lower ends $b$, the slotted plate or wrench pivoted between the arms at their lower ends, and having a hook D, rigidly connected thereto, and the link embracing the arms and free to move vertically thereon, but having its movement limited by shoulders $a$, said hook being adapted to engage with the link when it is raised up to the shoulders $a$ and to hold it in an elevated position, for the purpose specified.

3. The combination, substantially as hereinbefore set forth, of the bifurcated body portion having its lower arms parallel and provided with shoulders $a$, the slotted plate pivoted between the lower ends of the arms, having arms C′, inclined or tapered at $c'$ on one end and formed on the opposite end with a hook D, having a curved shank D′, and the link closely surrounding the parallel arms and bent or enlarged at $e$, for the purpose specified.

AMOS R. ABRAMS.

Witnesses:
   W. M. GLENN,
   CHARLES H. RAYMOND.